US012640856B2

(12) United States Patent (10) Patent No.: US 12,640,856 B2
Tahir (45) Date of Patent: May 26, 2026

(54) INTER DU CARRIER AGGREGATION

(71) Applicant: DISH Wireless L.L.C., Englewood, CO (US)

(72) Inventor: Wahaj Tahir, Parker, CO (US)

(73) Assignee: DISH WIRELESS L.L.C., Englewood, CO (US)

( * ) Notice: Subject to any disclaimer, the term of this patent is extended or adjusted under 35 U.S.C. 154(b) by 368 days.

(21) Appl. No.: 18/393,502

(22) Filed: Dec. 21, 2023

(65) Prior Publication Data

US 2025/0211376 A1 Jun. 26, 2025

(51) Int. Cl.
| | |
|---|---|
| *H04W 28/02* | (2009.01) |
| *H04L 5/00* | (2006.01) |
| *H04W 16/14* | (2009.01) |
| *H04W 72/0453* | (2023.01) |

(52) U.S. Cl.
CPC ............ *H04L 5/001* (2013.01); *H04L 5/0048* (2013.01); *H04W 16/14* (2013.01); *H04W 72/0453* (2013.01)

(58) Field of Classification Search
CPC .. H04L 5/0055; H04L 5/0094; H04W 52/146; H04W 52/0229; H04W 48/16; H04W 24/08; H04W 60/00; H04W 76/10; H04W 74/0836; H04W 74/006; H04W 72/566; H04W 72/20
See application file for complete search history.

(56) References Cited

U.S. PATENT DOCUMENTS

| | | | |
|---|---|---|---|
| 2022/0377825 A1* | 11/2022 | Centonza | .............. H04W 48/14 |
| 2023/0199521 A1 | 6/2023 | Cui et al. | |
| 2023/0344567 A1* | 10/2023 | Turner | .................. H04W 76/15 |

FOREIGN PATENT DOCUMENTS

| | | |
|---|---|---|
| CN | 109075932 A | 12/2018 |
| CN | 114614952 A | 6/2022 |
| KR | 20190015665 A | 2/2019 |

OTHER PUBLICATIONS

International Search Report and Written Opinion, mailed Mar. 4, 2025, for International Application No. PCT/US2024/056522, 132 pages.

* cited by examiner

*Primary Examiner* — Phuoc H Doan
(74) *Attorney, Agent, or Firm* — Seed Intellectual Property Law Group LLP

(57) ABSTRACT

Technologies for inter DU carrier aggregation are disclosed. An example method includes identifying, by a CU, multiple DUs associated with the CU for carrier aggregation. A first subset of the DUs is associated with a first cell and a second subset of the DUs associated with a second cell. The method also includes configuring, by the CU, the DUs to aggregate selected component carriers, and scheduling, by the CU, data transmission across the aggregated selected component carriers as a basis for the DUs to transmit and receive data.

20 Claims, 4 Drawing Sheets

INTER DU CARRIER AGGREGATION

BACKGROUND

In telecommunications, 5G is the fifth-generation technology standard for broadband cellular networks. 5G networks are cellular networks, in which the service area is divided into small geographical areas called cells.

As the use of smart phones and other user devices in 5G networks has increased, so too has the desire for more reliable, fast, and continuous transmission of content. In an effort to improve the content transmission, networks continue to improve with faster speeds and increased bandwidth. The increase in the number of user devices, however, has also resulted in increased cellular traffic. There remains a need for technologies to improve service quality for user devices in communication with one or more cells.

BRIEF SUMMARY

Carrier aggregation (CA) is typically supported within a same cell site, e.g., combining carriers on a single sector to achieve higher throughputs. Unfortunately, radio frequency (RF) coverage does not work in a linear manner. Due to propagation challenges, one or more bands may not be ready to be aggregated which can cause user devices to experience poor throughputs or other negative performances of the network.

In some embodiments, a computer-implemented method for inter Distributed Unit (DU) carrier aggregation in a Fifth Generation (5G) communications network includes: identifying, by a Centralized Unit (CU), a plurality of DUs associated with the CU for carrier aggregation, wherein a first subset of the DUs is associated with a first cell of the 5G communications network and a second subset of the DUs is associated with a second cell of the 5G communications network; configuring, by the CU, the plurality of DUs to aggregate selected component carriers; and scheduling, by the CU, data transmission across the aggregated selected component carriers as a basis for the plurality of DUs to transmit and receive data.

In some embodiments, identifying the plurality of DUs is based on coverage overlapping information obtained from at least a set of User Equipment (UE) in communication with at least one of the first cell or the second cell. In some embodiments, identifying the plurality of DUs is based on at least one of frequency bands of component carriers supported by individual DUs, one or more distances between individual DUs, or traffic load on individual DUs.

In some embodiments, configuring the plurality of DUs to aggregate selected component carriers comprises sending, from the CU to the plurality of DUs, configuration messages that indicate frequency bands of the selected component carriers for aggregation. In some embodiments, the configuration messages further indicate at least one of a bandwidth of the aggregated selected component carriers or scheduling and transmission parameters.

In some embodiments, scheduling the data transmission across the aggregated selected component carriers comprises determining a distribution of timing and quantity for data transmission among the plurality of DUs. In some embodiments, the determining is based on at least one of a channel quality between the plurality of DUs and connected UE, a traffic load on each of the plurality of DUs, or a Quality of Service (QoS) requirement of the connected UE.

In some embodiments, a system for efficient handover in a communications network includes at least one memory that stores computer executable instructions and at least one processor that executes the computer executable instructions to cause actions to be performed. The actions includes: identifying a plurality of DUs associated with a Centralized Unit (CU) for carrier aggregation, wherein at least two subsets of the DUs are each associated with a different cell of the communications network; configuring the plurality of DUs to aggregate selected component carriers; and scheduling data transmission across the aggregated selected component carriers as a basis for the plurality of DUs to transmit and receive data.

In some embodiments, identifying the plurality of DUs is based on coverage overlapping information obtained from at least a set of User Equipment (UE) in communication with cells associated with the CU. In some embodiments, identifying the plurality of DUs is based on at least one of frequency bands of component carriers supported by individual DUs, one or more distances between individual DUs, or traffic load on individual DUs.

In some embodiments, configuring the plurality of DUs to aggregate selected component carriers comprises sending, from the CU to the plurality of DUs, configuration messages that indicate frequency bands of the selected component carriers for aggregation. In some embodiments, the configuration messages further indicate at least one of a bandwidth of the aggregated selected component carriers or scheduling and transmission parameters.

In some embodiments, scheduling the data transmission across the aggregated selected component carriers comprises determining a distribution of timing and quantity for data transmission among the plurality of DUs. In some embodiments, the determining is based on at least one of a channel quality between the plurality of DUs and connected UE, a traffic load on each of the plurality of DUs, or a Quality of Service (QoS) requirement of the connected UE.

In some embodiments, a non-transitory computer-readable medium stores contents that, when executed by one or more processors, cause the one or more processors to perform actions. The actions include: identifying a plurality of DUs associated with a Centralized Unit (CU) for carrier aggregation, wherein at least two subsets of the DUs are each associated with a different cell of the communications network; configuring the plurality of DUs to aggregate selected component carriers; and scheduling data transmission across the aggregated selected component carriers as a basis for the plurality of DUs to transmit and receive data.

In some embodiments, identifying the plurality of DUs is based on coverage overlapping information obtained from at least a set of User Equipment (UE) in communication with cells associated with the CU. In some embodiments, identifying the plurality of DUs is based on at least one of frequency bands of component carriers supported by individual DUs, one or more distances between individual DUs, or traffic load on individual DUs.

In some embodiments, configuring the plurality of DUs to aggregate selected component carriers comprises sending, from the CU to the plurality of DUs, configuration messages that indicate frequency bands of the selected component carriers for aggregation. In some embodiments, scheduling the data transmission across the aggregated selected component carriers comprises determining a distribution of timing and quantity for data transmission among the plurality of DUs. In some embodiments, the determining is based on at least one of a channel quality between the plurality of DUs and connected UE, a traffic load on each of the plurality of DUs, or a Quality of Service (QoS) requirement of the connected UE.

DETAILED DESCRIPTION

Figure 1:
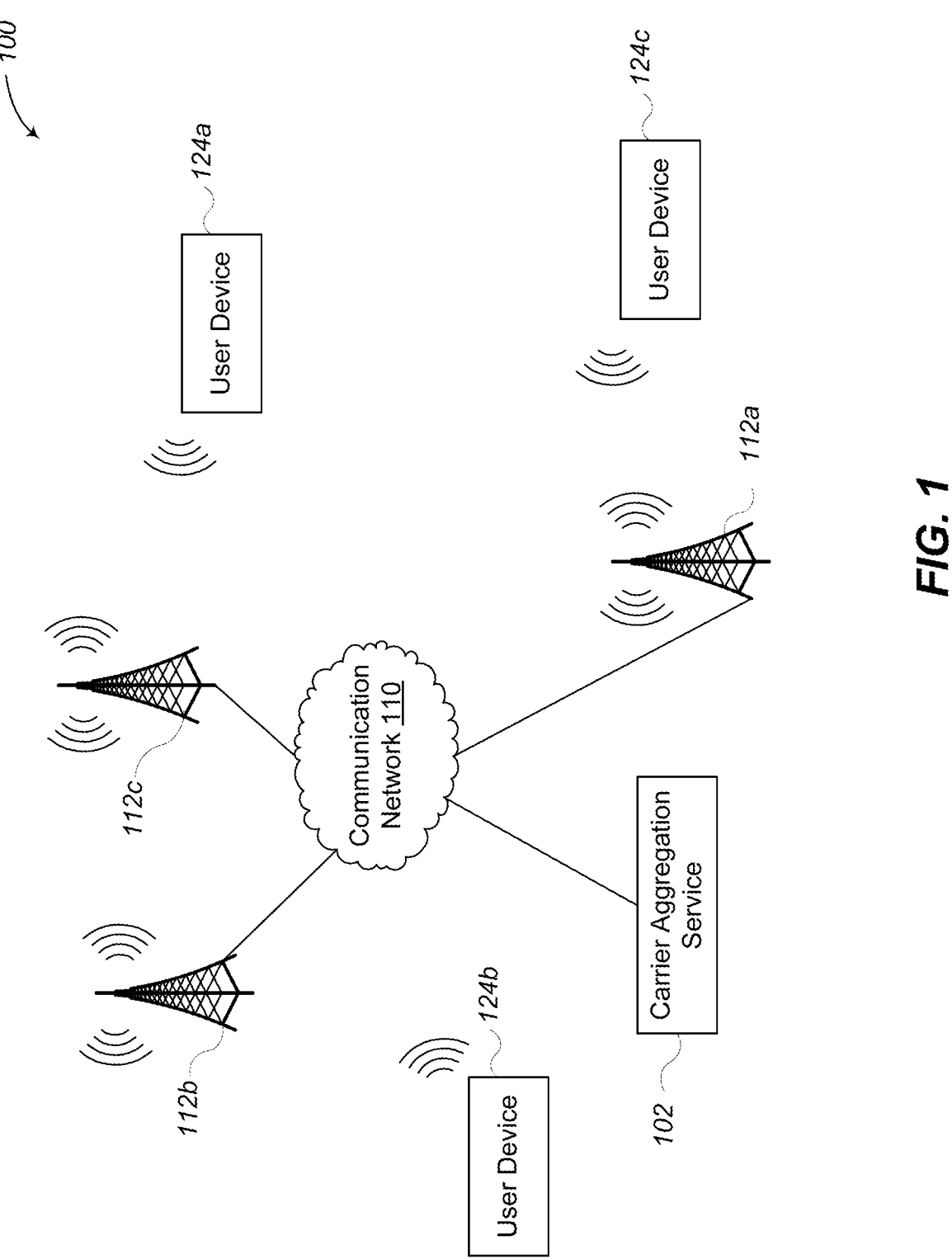
FIG. 1 illustrates a context diagram of an environment for inter DU carrier aggregation in a 5G communications network in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects. The following list includes certain acronyms used herein:

5G: Fifth Generation.
RAN: Radio Access Network.
O-RAN: Open RAN.
gNB: Next Generation NodeB.
API: Application Programming Interface.
CU: Central Unit.
DU: Distributed Unit.
UE: User Equipment (e.g., cell phone, smart phone, Internet of Things (IoT) device, or other devices connected to a communication network).

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

In accordance with various embodiments of the presently disclosed technology, inter DU carrier aggregation can take advantage of overlapping coverage from two or more different cell sites (e.g., gNBs) and help improve communication throughputs, whereby multiple frequency bands or blocks (also referred to as component carriers) are assigned to a same UE. Inter DU carrier aggregation in O-RAN can be implemented by aggregating component carriers (CCs) from different DUs to provide increased bandwidth and throughput to UE. Illustratively, a centralized CU in communication with the DUs can coordinate the scheduling and transmission of data across the aggregated CCs.

FIG. 1 illustrates a context diagram of an environment 100 for inter DU carrier aggregation in a 5G communications network in accordance with embodiments described herein. Environment 100 includes a plurality of cells 112a-112c (e.g., associated with individual gNBs), a plurality of user devices 124a-124c, a carrier aggregation service 102, and a communication network 110. Illustratively, the cells 112a-112c correspond to cell sites (e.g., cellular towers of gNBs) that together implement a 5G cellular communications network. The cells 112a-112c may include or be in communication with base stations, radio back haul equipment, antennas, or other devices, which are not illustrated for ease of discussion.

Each cell 112 provides 5G compatible cellular communications over one or more coverage areas. The coverage area(s) of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via the communication network 110. Communication network 110 includes one or more wired or wireless networks, which may include a series of smaller or private connected networks that carry information between the cells 112a-112c.

The user devices 124a-124c are computing devices that receive and transmit cellular communication messages with the cells 112a-112c, e.g., via antennas or other means. Examples of user devices 124a-124c may include, but are not limited to, mobile devices, smartphones, tablets, cellular-enabled laptop computers, or other UE or computing devices that can communicate with a 5G cellular network.

In various embodiments, the carrier aggregation service 102 can include one or more computing devices for performing the carrier aggregation functions described herein. The carrier aggregation service 102 can include, interface with, or otherwise communicate with multiple elements (e.g., CU, DU, UE, or the like) of the 5G network, via the communication network 110 or by other applicable means. Some of those interfaces may be standard. The interface to core elements of the 5G network may be direct or may leverage an external API gateway. The carrier aggregation service 102 may also interface or otherwise communicate with systems or devices external to the communication network 110.

In some implementations of the 5G communications network, the entirety or at least some components or elements of the network core (e.g., 5G core) can be implemented logically or virtually, via one or more cloud service providers. For example, CUs and DUs can be implemented in one or more data centers of the cloud service provider(s). The network core communicates with various cell sites that are located in different geographic or network locations, subjecting to control of same or different entities. An individual CU can be assigned to or otherwise associated with one or more cell sites, and can communicate with one or more DUs that are assigned to or otherwise associated with the cell site(s). In some cases, the CU communicates with at least some of the DU(s) in a same data center.

The above description of the environment 100 and the various systems, networks, devices, and components therein is intended as a broad, non-limiting overview of an example environment in which various embodiments of the presently disclosed technology may be implemented. FIG. 1 illustrates just one example of an operating environment, and the various embodiments discussed herein are not limited to such environments. In particular, the environment 100 may contain other devices, systems and/or media not specifically described herein.

Figure 2:
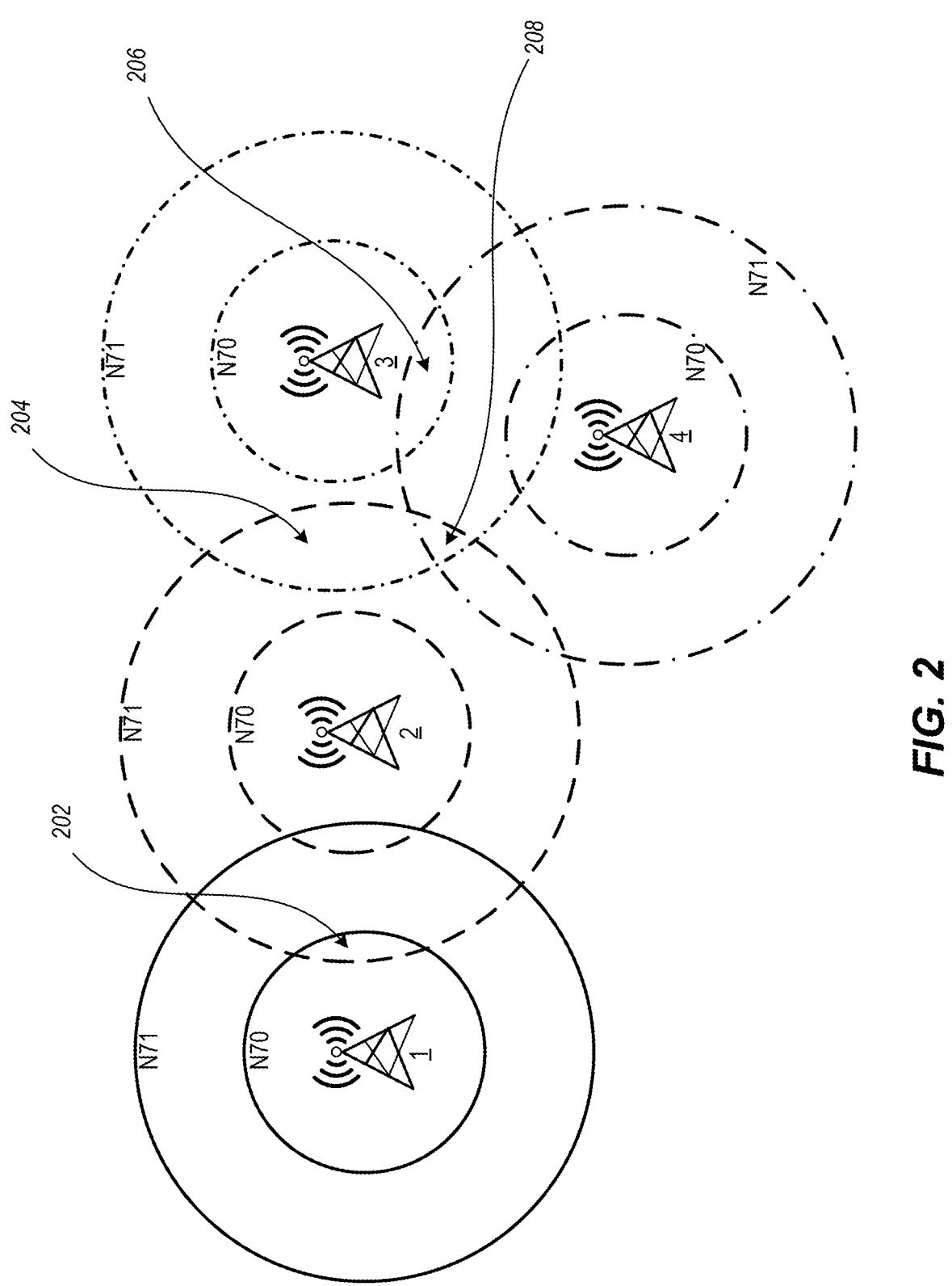
FIG. 2 illustrate example inter DU carrier aggregation implementations in accordance with coverage overlapping between or among cell sites.

FIG. 2 illustrates example inter DU carrier aggregation implementations in accordance with coverage overlapping between or among cell sites. As shown in FIG. 2, four example cell sites each have N70 band (represented by a smaller circle) and N71 band (represented by a larger circle) coverage areas. Accordingly, various coverage overlapping scenarios can exist and different types of inter DU carrier aggregation can be implemented based thereon. For example, the N70 and N71 bands of cell site 1 and the N71 band of cell site 2 can be aggregated for coverage overlapping region 202; the N71 band of cell site 2 and the N71 band of cell site 3 can be aggregated for coverage overlapping region 204; the N70 and N71 bands of cell site 3 and the N71 band of cell site 4 can be aggregated for coverage overlapping region 206; the N71 band of cell site 2, the N71 band of cell site 3, and the N71 band of cell site 4 can be aggregated for coverage overlapping region 208; and so on and so forth.

In some embodiments, at least the Xn interface can be used for data transmission coordination between DUs of different cell sites for implementation of inter DU carrier aggregation. In some embodiments, the one-way latency between different DUs used for a particular aggregation implementation can be required to not exceed a defined threshold, such as 20 milliseconds, 20 micro seconds, or even lower.

Figure 3:
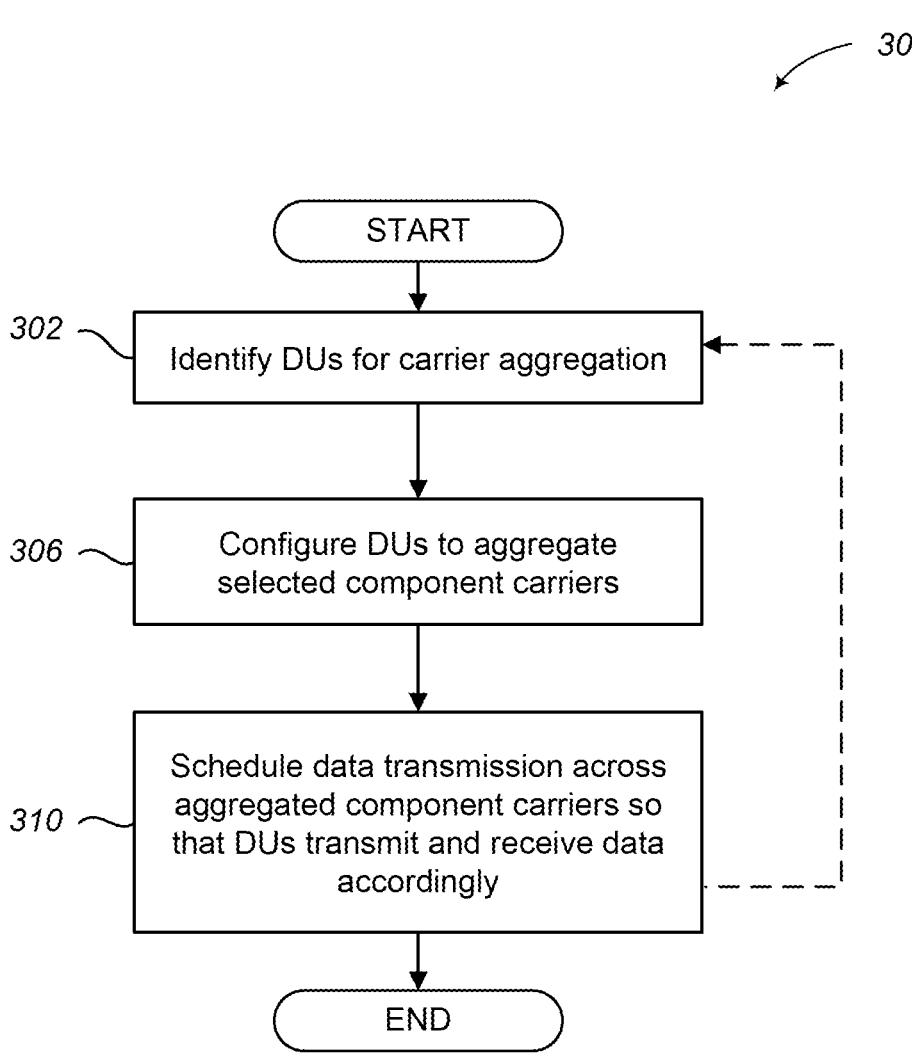
FIG. 3 is a flow diagram illustrating an example process 300 for inter DU carrier aggregation in accordance with one or more embodiments of the presently disclosed technology.

FIG. 3 is a flow diagram illustrating an example process 300 for inter DU carrier aggregation in accordance with one or more embodiments of the presently disclosed technology. In various embodiments, the process 300 is performed in real time relative to user device communication with cell(s), and at least some part of the process 300 is performed in a transparent manner to a user of user device. Illustratively, at least some part of the process 300 can be implemented by the carrier aggregation service 102, one or more user devices 124, or an applicable component of network core in accordance with the environment 100 of FIG. 1.

The process 300 starts at block 302, which includes identifying DUs that have component carriers (CCs) available and suitable for carrier aggregation. As shown in FIG. 2, DUs from different cell sites can be identified to facilitate a variety types of carrier aggregation for different coverage overlapping scenarios. Illustratively, a CU can use information on network topology and available CCs, which is stored locally or otherwise accessible to the CU, to identify the DUs having CCs that can be aggregated. In some embodiments, identifying the DUs is based on coverage overlapping information obtained from at least a set of UE in communication with two or more cells. In some embodiments, identifying the DUs is based on at least one of frequency bands of CCs supported by individual DUs, one or more distances between individual DUs, or traffic load on individual DUs.

At block 304, the process 300 includes configuring the identified DUs to aggregate selected CCs (e.g., selection based on overlapping coverage, inter-DU communication latency, or the like). The configuring of DUs can include sending, from a CU to the DUs, configuration messages that indicate frequency bands of the selected CCs for aggregation. In some embodiments, the configuration messages further indicate at least one of a bandwidth of the aggregated selected CCs or scheduling and transmission parameters.

At block 310, the process 300 includes scheduling data transmission across the aggregated selected CCs so that DUs transmit and receive data according to the scheduling. The CU can perform the scheduling of data transmission across the aggregated CCs. The scheduling can include determining a distribution of timing and quantity for data transmission among the DUs, e.g., deciding which DU(s) to transmit data at any given time and how much data to transmit via each DU.

In some embodiments, the determining is based on at least one of a channel quality between the DUs and connected UE, a traffic load on individual DUs, or a Quality of Service (QoS) requirement of the connected UE. According to the scheduling (e.g., provided by the CU), the DUs can transmit and receive data on the aggregated CCs. The DUs can use various applicable techniques to coordinate their transmissions and receptions, such as using carrier synchronization and interference cancellation. In some embodiments, the process 300 proceeds back to block 302 to further identify or update DUs that have CCs available and suitable for carrier aggregation.

As described above, inter DU carrier aggregation can involve careful coordination between a CU and multiple DUs. It can improve the performance of mobile or other wireless networks and provide significant performance benefits to UE, especially in dense urban areas where there is a lot of competition for spectrum. By aggregating CCs from different DUs, inter DU carrier aggregation can provide at least increased bandwidth and throughput to UE.

Figure 4:
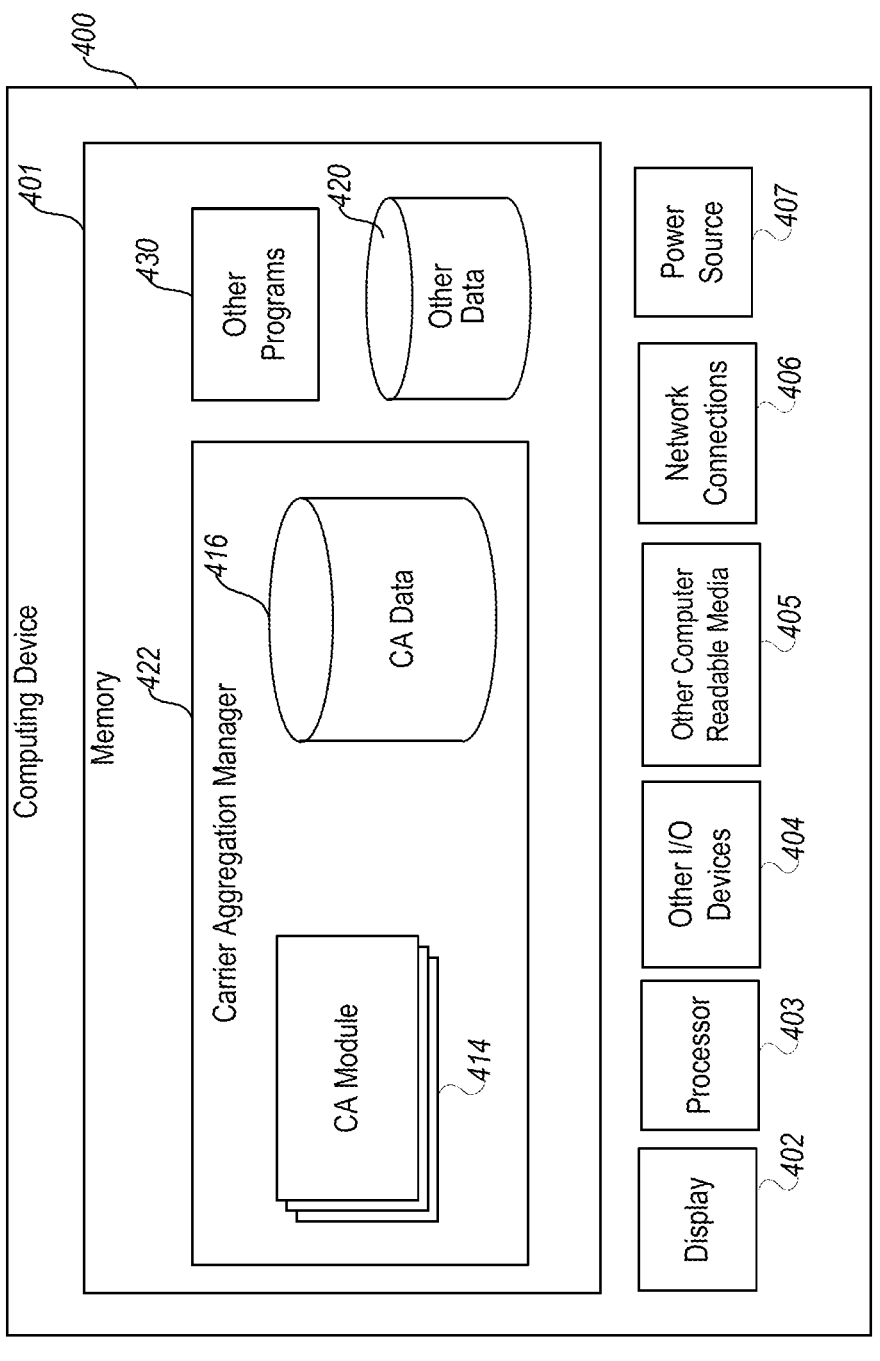
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to the carrier aggregation service 102, a CU, a DU, an element or component of the communication network 110, a user device 124, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the carrier aggregation manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The carrier aggregation manager 422 is shown residing in memory 401. In other embodiments, some portion of the contents and some, or all, of the components of the carrier aggregation manager 422 may be stored on and/or transmitted over the other computer-readable media 405. The components of the computing device 400 and carrier aggregation manager 422 can execute on one or more processors 403 and implement applicable functions described herein. In some embodiments, the carrier aggregation manager 422 may operate as, be part of, or work in conjunction and/or cooperation with other software applications stored in memory 401 or on various other computing devices. In some embodiments, the carrier aggregation manager 422 also facilitates communication with peripheral devices via the I/O devices 404, or with another device or system via the network connections 406.

The one or more carrier aggregation modules 414 is configured to perform actions related, directly or indirectly, to DU identification, aggregation configuration, transmission scheduling and other functions described herein. In some embodiments, the carrier aggregation module(s) 414 stores, retrieves, or otherwise accesses at least some carrier aggregation-related data on some portion of the carrier aggregation data storage 416 or other data storage internal or external to the computing device 400. In various embodiments, at least some of the handover modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and carrier aggregation 422 include API(s) that provides programmatic access to add, remove, or change one or more functions of the computing device 400. In some embodiments, components/modules of the computing device 400 and carrier aggregation manager 422 are implemented using standard programming techniques. For example, the carrier aggregation manager 422 may be implemented as an executable running on the processor(s) 403, along with one or more static or dynamic libraries. In other embodiments, the computing device 400 and carrier aggregation manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the carrier aggregation manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a carrier aggregation manager 422 implementation. Also, other functions could be implemented and/or performed by each component/module, and in different orders, and by different components/modules, yet still achieve the functions of the computing device 400 and carrier aggregation manager 422.

In addition, programming interfaces to the data stored as part of the computing device 400 and carrier aggregation manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The carrier aggregation data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the carrier aggregation manager 422.

Furthermore, in some embodiments, some or all of the components of the computing device 400 and carrier aggregation manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FP-GAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/ or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for inter Distributed Unit (DU) carrier aggregation in a communications network, the method comprising:

identifying, by a Centralized Unit (CU), a plurality of DUs associated with the CU for carrier aggregation, wherein a first subset of the DUs is associated with a first cell of the communications network and a second subset of the DUs is associated with a second cell of the communications network;

configuring, by the CU, the plurality of DUs to aggregate selected component carriers; and scheduling, by the CU, data transmission across the aggregated selected component carriers as a basis for the plurality of DUs to transmit and receive data.

2. The method of claim 1, wherein identifying the plurality of DUs is based on coverage overlapping information obtained from at least a set of User Equipment (UE) in communication with at least one of the first cell or the second cell.

3. The method of claim 1, wherein identifying the plurality of DUs is based on at least one of frequency bands of component carriers supported by individual DUs, one or more distances between individual DUs, or traffic load on individual DUs.

4. The method of claim 1, wherein configuring the plurality of DUs to aggregate selected component carriers comprises sending, from the CU to the plurality of DUs, configuration messages that indicate frequency bands of the selected component carriers for aggregation.

5. The method of claim 4, wherein the configuration messages further indicate at least one of a bandwidth of the aggregated selected component carriers or scheduling and transmission parameters.

6. The method of claim 1, wherein scheduling the data transmission across the aggregated selected component carriers comprises determining a distribution of timing and quantity for data transmission among the plurality of DUs.

7. The method of claim 6, wherein the determining is based on at least one of a channel quality between the plurality of DUs and connected UE, a traffic load on each of the plurality of DUs, or a Quality of Service (QoS) requirement of the connected UE.

8. A system for efficient handover in a communications network, comprising:

at least one memory that stores computer executable instructions; and at least one processor that executes the computer executable instructions to cause actions to be performed, the actions comprising:

identifying a plurality of DUs associated with a Centralized Unit (CU) for carrier aggregation, wherein at least two subsets of the DUs are each associated with a different cell of the communications network;

configuring the plurality of DUs to aggregate selected component carriers; and scheduling data transmission across the aggregated selected component carriers as a basis for the plurality of DUs to transmit and receive data.

9. The system of claim 8, wherein identifying the plurality of DUs is based on coverage overlapping information obtained from at least a set of User Equipment (UE) in communication with cells associated with the CU.

10. The system of claim 8, wherein identifying the plurality of DUs is based on at least one of frequency bands of component carriers supported by individual DUs, one or more distances between individual DUs, or traffic load on individual DUs.

11. The system of claim 8, wherein configuring the plurality of DUs to aggregate selected component carriers comprises sending, from the CU to the plurality of DUs, configuration messages that indicate frequency bands of the selected component carriers for aggregation.

12. The system of claim 11, wherein the configuration messages further indicate at least one of a bandwidth of the aggregated selected component carriers or scheduling and transmission parameters.

13. The system of claim 8, wherein scheduling the data transmission across the aggregated selected component carriers comprises determining a distribution of timing and quantity for data transmission among the plurality of DUs.

14. The system of claim 13, wherein the determining is based on at least one of a channel quality between the plurality of DUs and connected UE, a traffic load on each of the plurality of DUs, or a Quality of Service (QoS) requirement of the connected UE.

15. A non-transitory computer-readable medium storing contents that, when executed by one or more processors, cause the one or more processors to perform actions comprising:

identifying a plurality of DUs associated with a Centralized Unit (CU) for carrier aggregation, wherein at least two subsets of the DUs are each associated with a different cell of a communications network;

configuring the plurality of DUs to aggregate selected component carriers; and scheduling data transmission across the aggregated selected component carriers as a basis for the plurality of DUs to transmit and receive data.

16. The non-transitory computer-readable medium of claim 15, wherein identifying the plurality of DUs is based on coverage overlapping information obtained from at least a set of User Equipment (UE) in communication with cells associated with the CU.

17. The non-transitory computer-readable medium of claim 15, wherein identifying the plurality of DUs is based on at least one of frequency bands of component carriers supported by individual DUs, one or more distances between individual DUs, or traffic load on individual DUs.

18. The non-transitory computer-readable medium of claim 15, wherein configuring the plurality of DUs to aggregate selected component carriers comprises sending, from the CU to the plurality of DUs, configuration messages that indicate frequency bands of the selected component carriers for aggregation.

19. The non-transitory computer-readable medium of claim 15, wherein scheduling the data transmission across the aggregated selected component carriers comprises determining a distribution of timing and quantity for data transmission among the plurality of DUs.

20. The non-transitory computer-readable medium of claim 19, wherein the determining is based on at least one of a channel quality between the plurality of DUs and connected UE, a traffic load on each of the plurality of DUs, or a Quality of Service (QoS) requirement of the connected UE.

* * * * *